April 8, 1958     H. E. LEINWEBBER     2,829,436
CENTERING GAUGE
Filed Dec. 23, 1955
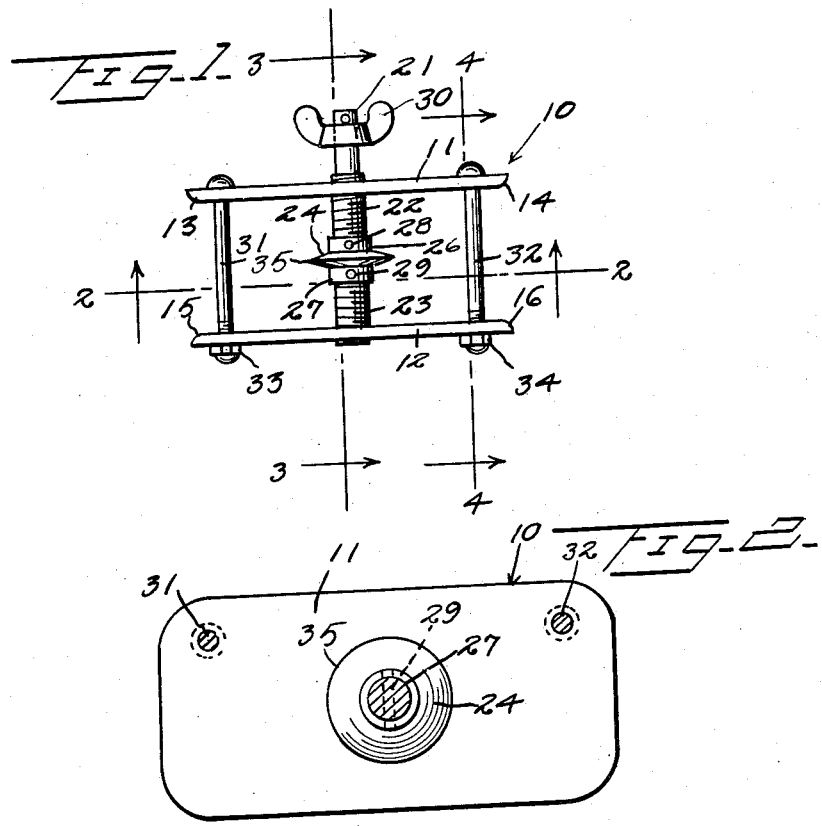
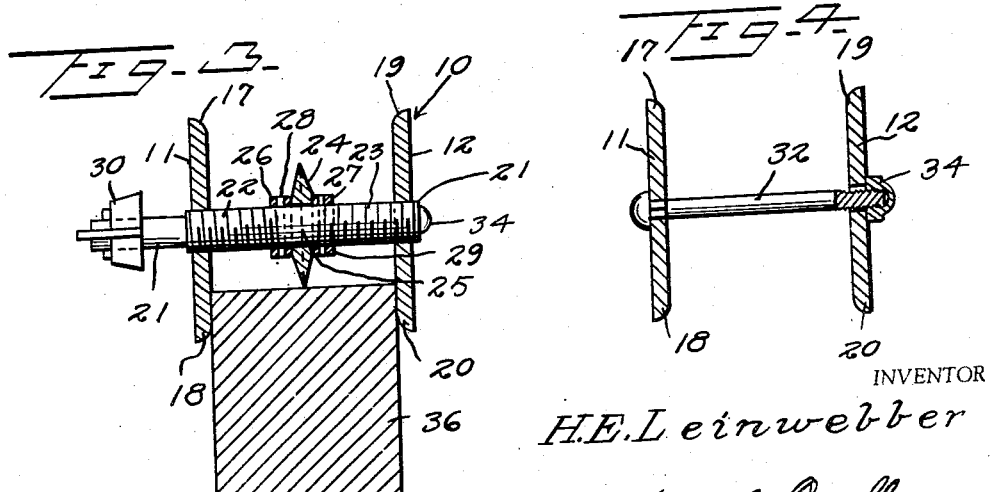
INVENTOR
H. E. Leinwebber
BY Kimmel & Crowell
ATTORNEYS United States Patent Office 2,829,436
Patented Apr. 8, 1958

2,829,436

CENTERING GAUGE

Henry E. Leinwebber, Endicott, Wash.

Application December 23, 1955, Serial No. 555,113

1 Claim. (Cl. 33—42)

The present invention relates to a centering gauge, and more particularly to such a gauge which can be utilized for marking the center line along the edges of boards and the like.

A primary object of the invention is to provide a center line marking gauge which will be maintained in centered position constantly regardless of the degree of adjustment.

Another object of the invention is to provide a device of the class described in which the guide members of the gauge are locked in adjusted position.

A further object of the invention is to provide a centering gauge of the class described which will be inexpensive to manufacture, accurate in use, and simple to adjust.

Other objects and advantages will become apparent in the following specification when considered in the light of the attached drawing, in which:

Figure 1 is a top plan view of the invention.

Figure 2 is a longitudinal section taken along the line 2—2 of Figure 1, looking in the direction of the arrows.

Figure 3 is a transverse section taken along the line 3—3 of Figure 1, looking in the direction of the arrows.

Figure 4 is a transverse section taken along the line 4—4 of Figure 1, looking in the direction of the arrows.

Referring now to the drawing in detail wherein like reference numerals indicate like parts throughout the several figures, the reference numeral 10 indicates generally a centering gauge constructed according to the invention, having a pair of guide plates 11 and 12 positioned in spaced apart parallel relation. The inner end edges 13 and 14 of the guide plate 11, the inner end edges 15 and 16 of the guide plate 12, the inner top and bottom edges 17 and 18 of the guide plate 11, and the inner top and bottom edges 19 and 20 of the guide plate 12 are all beveled to provide smooth engaging edges for the plates 11 and 12.

A reversely threaded shaft 21 extends through the guide plates 11 and 12 with the portion 22 of the shaft 21 being threaded in one direction and the portion 23 of the shaft 21 being threaded oppositely. A marking wheel 24 is rotatably supported on a central portion 25 of the shaft 21 and maintained thereon by means of collars 26 and 27 engaging opposite faces of the wheel 24. The collars 26 and 27 are secured to the shaft 21 by means of pins 28 and 29. A handle 30 is secured to the outer end of the shaft 21 to permit its rotation with respect to the plates 11 and 12, respectively.

Clamping bolts 31 and 32 provided with cap nuts 33 and 34, respectively, extend between the clamping plates 11 and 12 at opposite ends thereof to provide a positive lock securing the plates 11 and 12 against relative rotation. The marking wheel 24 is sharpened at 35 so that a mark can be scribed on the work 36 over which the centering gauge is passed, as illustrated in Figure 3.

In the use and operation of the invention, the plates 11 and 12 are adjusted by turning the handle 30 and shaft 21 until the inner faces of the plates 11 and 12 coincide with the outer dimension of the work to be marked. The bolts 31 and 32 act to prevent rotation of the plates 11 and 12 as they are moved to adjusted position. The plates 11 and 12 are then engaged over the work as illustrated in Figure 3, and the device is moved along the work 36 marking the center line thereon. Obviously, the reversed threaded portions 22 and 23 of the shaft 21 will constantly maintain the center position of the wheel 24 as the plates 11 and 12 are adjusted for work of varying thickness.

Having thus described the preferred embodiment of the invention, it should be understood that numerous modifications and structural adaptations may be resorted to without departing from the scope of the appended claim.

What is claimed is:

A centering gauge comprising a pair of longitudinally elongated flat generally rectangular spaced parallel guide plates adapted to be engaged against opposite sides of an article to be gauged and marked, said plates each having a transverse bore centrally positioned between the upper and lower edges of said plate and centrally positioned between the ends of said plate, said bores being axially aligned and oppositely threaded, a shaft having the opposite end portions thereof oppositely threaded and engaged in the threaded bores in said plates so that rotation of said shaft will move said plates oppositely an equal distance along said shaft, a handle fixedly secured to one end of said shaft for rotation of said shaft, a marking wheel journalled on said shaft intermediate said guide plates, collars fixed to said shaft on opposite sides of said wheel maintaining said wheel centrally on said shaft, said plates having axially aligned smooth bores adjacent each end thereof intermediate the upper and lower edges thereof, and a pair of headed rods extending through said aligned smooth bores at opposite ends of said plates maintaining said plates in aligned relation.

References Cited in the file of this patent

UNITED STATES PATENTS

| | | |
|---|---|---|
| 787,893 | Christoph | Apr. 25, 1905 |
| 1,166,968 | Carter | Jan. 4, 1916 |
| 1,280,379 | Bonney | Oct. 1, 1918 |
| 1,475,104 | York | Nov. 20, 1923 |
| 1,737,726 | Muzyn | Dec. 3, 1929 |
| 2,603,002 | Rubin et al. | July 15, 1952 |
| 2,686,972 | Sanford | Aug. 24, 1954 |